(12) United States Patent
Klemm et al.

(10) Patent No.: US 10,038,330 B2
(45) Date of Patent: Jul. 31, 2018

(54) METHOD FOR CONTROLLING THE BATTERY CAPACITY OF A SECONDARY BATTERY AND BATTERY-DRIVEN HOUSEHOLD ELECTRICAL APPLIANCE

(71) Applicant: Braun GmbH, Kronberg (DE)

(72) Inventors: Torsten Klemm, Eschborn (DE); Jan Christian Langsdorf, Oberursel (DE); Gerd Laschinski, Oberursel (DE); Hartmut Loth-Krausser, Stockstadt am Rhein (DE); Christof Ungemach, Frankfurt (DE)

(73) Assignee: Braun GMBH, Kronberg (DE)

( * ) Notice: Subject to any disclaimer, the term of this patent is extended or adjusted under 35 U.S.C. 154(b) by 33 days.

(21) Appl. No.: 15/173,783

(22) Filed: Jun. 6, 2016

(65) Prior Publication Data

US 2016/0365741 A1    Dec. 15, 2016

(30) Foreign Application Priority Data

Jun. 10, 2015   (EP) .................................... 15171359

(51) Int. Cl.
*H02J 7/00*          (2006.01)

(52) U.S. Cl.
CPC .............. *H02J 7/0068* (2013.01); *H02J 7/00* (2013.01); *H02J 7/008* (2013.01); *H02J 7/0063* (2013.01)

(58) Field of Classification Search
CPC ............... H02J 7/0031; H02J 2007/004; H02J 2007/0037; Y02E 60/12; H01M 10/48

(Continued)

(56) References Cited

U.S. PATENT DOCUMENTS

| 4,965,738 A | 10/1990 | Bauer et al. |
| 6,346,795 B2 | 2/2002 | Haraguchi et al. |

(Continued)

OTHER PUBLICATIONS

PCT International Search Report with Written Opinion in corresponding Int'l Appln. PCT/IB2016/053302 dated Aug. 22, 2016.

*Primary Examiner* — Arun Williams
(74) *Attorney, Agent, or Firm* — Ronald T. Sia; Kevin C. Johnson

(57) ABSTRACT

Method for controlling the battery capacity of a secondary battery in a battery-driven household electrical appliance and a respective household electrical appliance are described, wherein the battery-driven household electrical appliance has an electrical load and a control means adapted to control the operation of the household electrical appliance and to monitor the capacity of the secondary battery, said method comprising the following steps:
recognizing a situation of storage of the household electrical appliance in which the household electrical appliance is not in use;
determining the current capacity of the secondary battery;
comparing the current capacity of the secondary battery with a desired storage capacity for the electrical household appliance;
activating an energy-consuming load in the electrical household appliance if the current capacity of the secondary battery is higher than the desired storage capacity until the current capacity is equal to the desired storage capacity;
activating an energy saving stand-by mode of the household electrical appliance until the household electrical appliance is used the next time.

14 Claims, 3 Drawing Sheets

(58) Field of Classification Search
USPC .......................................................... 320/134
See application file for complete search history.

(56) References Cited

U.S. PATENT DOCUMENTS

| | | | |
|---|---|---|---|
| 2003/0044660 A1* | 3/2003 | Motoyama | H01M 8/04089 |
| | | | 429/430 |
| 2007/0148539 A1 | 6/2007 | Pellenc | |
| 2007/0235071 A1* | 10/2007 | Work | H02J 7/35 |
| | | | 136/244 |
| 2008/0111520 A1* | 5/2008 | Sasaki | H02J 7/0031 |
| | | | 320/134 |
| 2009/0009136 A1 | 1/2009 | Heinrich et al. | |
| 2009/0108806 A1* | 4/2009 | Takano | B25F 5/02 |
| | | | 320/112 |
| 2009/0150101 A1* | 6/2009 | Itagaki | G01R 31/3648 |
| | | | 702/63 |
| 2010/0237831 A1 | 9/2010 | Osswald et al. | |
| 2011/0025274 A1 | 2/2011 | Kunkel et al. | |
| 2014/0253226 A1 | 9/2014 | Zhou et al. | |

* cited by examiner

METHOD FOR CONTROLLING THE BATTERY CAPACITY OF A SECONDARY BATTERY AND BATTERY-DRIVEN HOUSEHOLD ELECTRICAL APPLIANCE

FIELD OF THE INVENTION

A method for controlling the battery capacity of a secondary battery in a battery-driven household electrical appliance is described as well as a respective household electrical appliance. The household electrical appliance can be in particular a hair removing device such as a razor, epilator or the like, or a tooth treatment device such as a toothbrush, oral irrigator or the like, or a household tool works. This battery-driven household electrical appliance has an electrical (main) load and a control means adapted to control the operation of the household electrical appliance by switching off and on the electrical load. Further, the control means is adapted to monitor the capacity of the secondary battery. Further, it is possible that the control means is able to control charging of the secondary battery.

BACKGROUND OF THE INVENTION

For such household electrical appliances, it is known to monitor the state of charge (current capacity) of the secondary battery in order to indicate to the user the remaining run time of the battery-driven appliance well in advance to give a chance to charge the secondary battery before the appliance stops working. Further, it is known to have a battery control management in order to avoid damage to the secondary battery, e.g. by discharging of the secondary battery below a lower capacity limit.

In this context, the U.S. Pat. No. 6,346,795 B2 describes a discharge control circuit that securely prevents an over discharge of a battery. The control circuit includes a discharge control switch connected to the battery for cutting off discharge current of the battery in response to a discharge stop signal. The discharge stop signal is created when a voltage of at least one cell of the secondary battery reaches a lower limit.

However, lithium-ion secondary batteries often used in household electrical appliances are aging not only with an increasing number of charging and discharging cycles, high or low experienced temperatures, high charging or discharging currents, over charging or over discharging in particular, but also if the state of capacity of the secondary battery during a storage of the household electrical appliance is too high. These phenomena are well known and due to the high cell voltage of the fully charge lithium-ion secondary battery leading to a faster decomposing of the electrolyte compared to a lower charge status (current capacity) of the battery. Decomposition of the electrolyte leads to a rising inner resistance of the secondary battery and a lowering of the maximum capacity. This leads to a shorter possible use time after one charging.

In order to avoid that the secondary battery is already aged when the household electrical appliance is delivered to a customer before its first customer use, the secondary batteries of household electrical appliances are brought into a defined (lower) state of charge with respect to the maximum state of charge of the secondary batteries. To this aim, electrical household appliances are brought into a defined capacity state (state of charge of the secondary battery) by controlling an externally controlled charging and/or discharging process with presumably suited charging or discharging currents to adjust the capacity state of secondary battery as desired. Then, an energy saving stand-by mode of the household electrical appliance is activated. This adjustment of the current capacity of the second battery of the household electrical appliance is time consuming and requires a round-table production for enabling a cyclic interaction towards the end of the manufacturing process in order to timely start and stop charging and discharging processes. At the user's premises, no adjustment of the battery capacity to an optimum storage capacity is performed. Accordingly, the secondary battery might age stronger than necessary.

It is accordingly an object of the present invention to propose a method and a respective household electrical appliance suited to detect a situation of storage and to adjust the state of charge (current capacity) of the secondary battery of the household electrical appliance such that aging of the secondary battery is minimized during longer storage of the household electrical appliance without use.

SUMMARY OF THE INVENTION

This object is solved with a method according to claim 1 and a battery-driven household electrical appliance according to claim 12 performing the proposed method. The method according to the invention comprises the following steps:
Recognizing a situation of storage of the household electrical appliance in which the household electrical appliance is not in use. It can for example be determined if the household electrical appliance was not in use for a certain (predetermined) non-use-period. In particular in this case, a situation of storage might be assumed. The following steps might only be performed if a situation of storage is recognized.
Determining the current capacity of the secondary battery by measuring battery voltage preferably when the electrical load is switched off. The voltage—in particular in a state of non-use of the household electrical appliance—is indicative of the current capacity (state of charge) of the secondary battery.
Comparing the current capacity of the secondary battery with a desired storage capacity for the electrical household appliance.
Activating an energy-consuming load in the electrical household appliance if the current capacity of the secondary battery is higher than the desired storage capacity until the current capacity is equal to the desired storage capacity. This might be achieved by a closed loop control surveying the current capacity while the energy-consuming load is activated. In a simpler embodiment, the energy-consuming load might be activated for a certain time. After expiration of this certain time, the energy-consuming load can be switched off, and the current capacity is determined This cycle is continued until the current capacity is equal or less than the desired storage capacity.
Activating an energy saving stand-by mode of the household electrical appliance until the household electrical appliance is used next time.

According to the proposal, the battery-driven household electrical appliance might in particular comprise in one and the same housing the main electrical load, the control means and the secondary battery. The secondary battery might be disposed in the housing of the household electrical appliance such that it is not exchangeable by the user but has to be charged in the household electrical appliance using an electrical charger. The electrical charger might be external or comprised in the housing of the household electrical appliance. Connection to the mains can be achieved using a cable or inductive energy transfer (e.g. by setting the household electrical appliance in a charging cradle). The secondary battery might a single cell battery or a multi cell battery with at least two (or more) cells connected in series. The multiple cells might be comprised in one single housing or in more different housings. All different kinds of the battery shall all be covered by the term "secondary battery".

The major advantage of the present invention is that the control means, e.g. a processor, microcontroller or any other control device such as a charging integrated circuit, of the battery-driven household electrical appliance is able to perform the proposed method without external interaction. Thus, it is able to adjust the current capacity (state of charge) of the secondary battery to a suited capacity for a long storage of the household electrical appliance without use. This adjustment can be performed without any external control of the adjustment process as the processor or control means is self-controlling this state of capacity adjustment.

Determining and adjusting the current capacity of the secondary battery might comprise measuring the battery voltage (indicating the current capacity) and comparing with a desired battery voltage (corresponding to the desired storage capacity) for the household electrical appliance. If the measured voltage is higher than the desired storage voltage, the energy-consuming load is activated until the measurement voltage reaches the desired storage voltage. This introduces a kind of feedback control for the adjustment of the battery capacity to the desired storage capacity.

According to another embodiment it is possible that after charging of the battery completely to 100% capacity or to another predetermined capacity value, a discharge of the battery might be performed using a defined energy-consuming load with known energy consummation for a predetermined time. The predetermined time is chosen such that the battery has thereafter the desired storage capacity. The recognizing of a situation of storage might be performed before and/or after the charging of the battery to the predetermined capacity value, e.g. 100% capacity.

This includes the following situations:

A household electrical appliance (with an arbitrary current capacity/state of charge) is not used for a non-use-period of e.g. one, two or three days or more, such as one to about six to eight weeks. After recognizing such situation of storage, the battery might be fully charged and then the energy-consuming load is activated to adjust the current battery capacity to the desired storage capacity. Such situation might regularly occur for household electrical appliances such as e.g. epilators or razors used only once a week or less. After use the household electrical appliance it might be connected to a charger, however without starting a charging process for some reason. After recognizing the situation of storage, the controlled discharging is started by activating an energy-consuming load wherein the activation of the energy-consuming load comprises the activation of a microcontroller of the control means into an operational modus. In this operational modus, the microcontroller consumes continuously a significant amount of current form the secondary battery leading to a faster discharging of the secondary battery.

In another situation, the household electrical appliance is charged after use to the predetermined capacity value, e.g. 100% or 80% capacity. This might regularly occur if the household electrical appliance is connected to a charger after use wherein the charger starts charging of the battery. Then, after charging, the household electrical appliance is not used for a longer time such that a situation of storage is recognized. In this case, the controlled discharging of the battery is started as described before.

After the controlled discharging, an energy saving stand-by mode is activated by deactivating the energy-consuming load and/or other energy consuming means such as LED, motor, main processor or the like.

According to a preferred proposal, the control means comprises a microcontroller that is driven in a stand-by mode during the household electrical appliance is not operated, wherein during the stand-by mode the microcontroller is operated in a sleep modus interrupted by operation pulses in the operational modus before activating the energy saving stand-by mode. During the "normal" sleep modus, the current consumption is low compared to an operational modus. Low consumption during the sleep modus means less than 500 µA, and in particular less than 200 µA, preferably about 100 µA. During the operational modus, the current consumption of the microcontroller is in the order of 200 mA to 600 mA, and in particular in a range between 300 mA and 500 mA, preferably about 400 mA. Accordingly, the current consumption during the operational mode might be a factor of at least 10, preferably a factor of at least 30, and most preferably a factor of about (or at least) 40 higher than in the sleep modus.

The operation pulses of the microcontroller might have in line with the proposal a duty cycle of 0.5 s to 10 s, preferably between 0.75 s and 3.0 s, and very preferred a duty cycle in the order of 1 s. These operation pulses of the microcontroller are used to test the household electrical appliance for switching on, for example. Following, in the operational modus, the load of the household electrical appliance might be switched on, for example. The length of the operation pulses might be in the order of up to 100 µs, preferably in the order of up to 40 µs and most preferably in the order of up to 20-30 µs.

Accordingly, the energy consumption from the secondary battery during the stand-by mode is quite low while being able to start normal operation of the household electrical appliance upon user request within a short time of, e.g., 1 second. Accordingly, the battery capacity might not change significantly if the household electrical appliance is operated in the (normal) stand-by mode even for a time of several weeks or months.

The energy saving stand-by mode might, in line with a preferred embodiment of the proposal, comprise switching off the microcontroller entirely. Switching off the microcontroller (which means to switch it off entirely) means that the household electrical can by switched on only by charging the secondary battery, i.e. by connecting the household electrical appliance to the mains, for example by attaching a mains adapter to the household electrical appliance Simple actuation of the user switch for switching on the household electrical appliance does not have any effect. This is also a protection against stopping the energy saving stand-by mode inadvertently.

In this status (i.e. in the energy saving stand-by mode) of the electrical appliance, no electrical energy is drawn from the secondary battery. Accordingly, only self-discharging of the secondary battery occurs and the actual capacity is preserved best possible.

According to a preferred embodiment, a situation of storage of the household electrical appliance might be recognized by monitoring the switching off and on of the appliance and/or monitoring the charging of the secondary battery of the appliance, wherein a situation of storage is assumed when the latest switching off and on and/or the latest charging has not occurred for a defined (in the sense of predetermined) non-use-period before the current point in time. A suited non-use-period might be one, two, three or more days or one to about six or eight weeks, for example.

This non-use-period can be adaptable to typical times of use and/or charge of the electrical appliance and might be implanted into the control means of the household appliance during manufacturing. The non-use-period till the current point in time might be determined by simply starting a counter with known counting frequency when use and/or charging of the household electrical appliance is stopped. If the counter equivalent time equals the non-use-period, a situation of storage might be recognized. Every use or charging of the household electrical appliance resets the counter.

Another possibility to recognize a situation of storage of the household electrical appliance can be an initiation of a storage mode through a command to be executed by the control means. In this case, a command is given to the control means that a storage of the household electrical appliance is to be initiated, irrespective of whether the electrical appliance has been used before this command e.g. during the non-use-period. Such a storage mode command might be initiated after manufacturing and before shipment of the household electrical appliance to a user through a suited user interface. In this case, the processor will initiate the proposed method while the product can already be prepared and packed for distribution of the product in the market.

According to a preferred embodiment, it is possible to define the desired storage capacity as a capacity range. Background is that a certain capacity range is well suited for a secondary battery to be stored for a longer time of no use without any disadvantage for the state of health of the secondary battery. The definition of a suited range enhances the chance that the secondary battery is already in a suited condition so that the storage can be prepared without any discharging (or charging) process. The upper and lower capacity thresholds might also be defined as corresponding upper and lower voltage thresholds to be measured by the processor.

For a voltage measurement to determine the current capacity, the control means of the appliance, in particular the microcontroller, can be equipped with an analogue digital converter input to convert the voltage of a battery into a digital value. However, the invention is not limited to this embodiment. The one skilled in the art will choose an appropriate circuitry to measure the battery voltage in line with his common knowledge. Further, the current capacity might be estimated in certain situations, e.g. after charging of the secondary battery of the household electrical appliance One possibility to activate the energy-consuming load comprises activation of the control means into an operational modus in which the control means has higher energy consumption. The advantage of this solution is that no other electrical circuitry has to be provided in order to discharge the secondary battery until a suited state of charge is reached. This might be a normal operational modus compared to a (normal) stand-by mode, for example of the microcontroller. However, according to the proposal, this operational modus might also be a computational modus of a processor of the control means executing arbitrary processor operations leading to a higher energy consumption of the control means (e.g. the microcontroller). These arbitrary processor operations might be operations not used for the control of the household electrical appliance, e.g. simple counting operations. The result of these arbitrary processor operations will be disregarded if the desired state of capacity is reached.

According to another embodiment of the proposed method in can be provided that the activation of the energy-consuming load comprises additionally to switch on a current consuming (secondary) load in the circuitry. The secondary load might be a resistor integrated into the electrical circuit of the household electrical appliance only to this aim. The resistor can be included into a resistor-circuit switchable by the control means. Another possibility is the activation of a control LED or even the main load of the household electrical appliance, the main load being in particular an electrical motor or the like. Activation of the main load is, however, not a preferred embodiment as this might lead to complications if of electrical appliance is, e.g., already inserted to a product packaging. Another possibility is the activation of the main load in an idle mode without e.g. rotation of a motor shaft. In this case, complications due to e.g. vibration of the motor can be avoided.

It can be provided according to the invention that reaching the desired storage capacity by activating an energy-consuming load is determined by comparing a current measured voltage to a threshold voltage that is adapted to the voltage of the secondary battery during activation of the load (in-use-voltage). This is useful as the voltage of the secondary battery changes with switching off and on a load. In this case, the voltage threshold is chosen for a state in which the electrical load for discharging the battery is switched on.

According to another aspect of the present invention, charging of the secondary battery can be activated until the desired storage capacity of the secondary battery is reached if the current capacity of the secondary battery is lower than the desired storage capacity and the user electrical appliance is connected to a charger. The advantage is that a longer storage of the secondary battery is avoided when the battery is not in the optimum capacity range. The connection to the charger might be a connection to the mains or a charger cradle (or generally any charger). After the desired storage capacity of the secondary battery is reached, charging is stopped and the energy saving stand-by mode of the household electrical appliance is activated. A desired storage capacity will be assumed if a current measured voltage during charging is reaching a predetermined voltage threshold.

According to a preferred embodiment of the invention, the energy saving stand-by mode of the household electrical appliance can be stopped when the secondary battery of the household electrical appliance is charged.

The invention is also directed to a battery-driven household electrical appliance, in particular a hair removing device such as a razor, epilator or the like, or a tooth treatment device such as a toothbrush, oral irrigator or the like. The household electrical appliance has a secondary battery, an electrical load (main load) activated during the use of the household electrical appliance (such as an electrical motor), and control means adapted to control the operation of the household electrical appliance and adapted to monitor the capacity of the secondary battery. To this aim, the control means might be adapted to measure the voltage of the secondary battery. It is further adapted to switch off and on the main load of the household user electrical appliance. The control means is further adapted to perform the method as described before or parts thereof. The control means might e.g. be a processor, microcontroller or any other control device such as a charging integrated circuit.

Additionally, the control means can also be adapted to control charging of the secondary battery. The advantage of such battery-driven household electrical appliance is that this appliance is activating an energy saving stand-by mode having a suited state of charge of its secondary battery thus avoiding deterioration of the secondary battery during a longer storage without use of the household electrical appliance.

In case of an activation of a processor as control means for discharging the secondary battery, suited processor operations can be implemented in the processor mean that preferably do not influence other control features of the control means.

In another embodiment, the battery-driven household electrical appliance comprises a secondary load switchable by the control means. This secondary load might be a resistor circuit to consume electrical power and discharge the secondary battery if switched on by the control means. Instead of a resistor circuit, any other electrical load, such as a status LED of the household electrical appliance, the main load of the household electrical appliance (preferably in an idle mode) or the like, can be used.

A major advantage of a secondary load switchable by the control means or by a computational operation of the control means (e.g. a processor) itself and/or of a main load in an idle modus is that only a small amount of energy is consumed and a smooth discharging of the secondary battery of the household electrical appliance is performed. Due to the small energy consume it is possible that the product might be even packed in a product packaging when the discharging of the secondary battery takes place. The discharging of the battery does not make any noise or vibration disturbing if the product is packed in a product packaging or stored in the shelf. Further, due to the small amount of energy consumed, there is only low heat dissipation.

Accordingly, the proposed method is well suited to smoothly discharge a secondary battery of a household electrical appliance when the appliance is to be stored for a longer time. This has the advantage that the battery can be brought automatically (and through the household electrical appliance itself) to a desired storage capacity of the secondary battery enhancing the lifetime of the secondary battery.

Further, it is possible to completely charge a secondary battery during the charging process. If the household electrical appliance is not used after the charging due to a situation of storage without use, the secondary battery will be controlled discharged in order to avoid faster aging. If, contrary to a situation of storage, the battery is used after the charging, the maximum capacity of the secondary battery is available.

Further features, advantages and possibilities of use of the present invention are described following with respect to a preferred embodiment of the invention and the drawings. All features described and/or shown in the drawings are subject matter of the invention, irrespective of the grouping of the features in the claims and/or their back references.

DETAILED DESCRIPTION OF THE INVENTION

Figure 1:
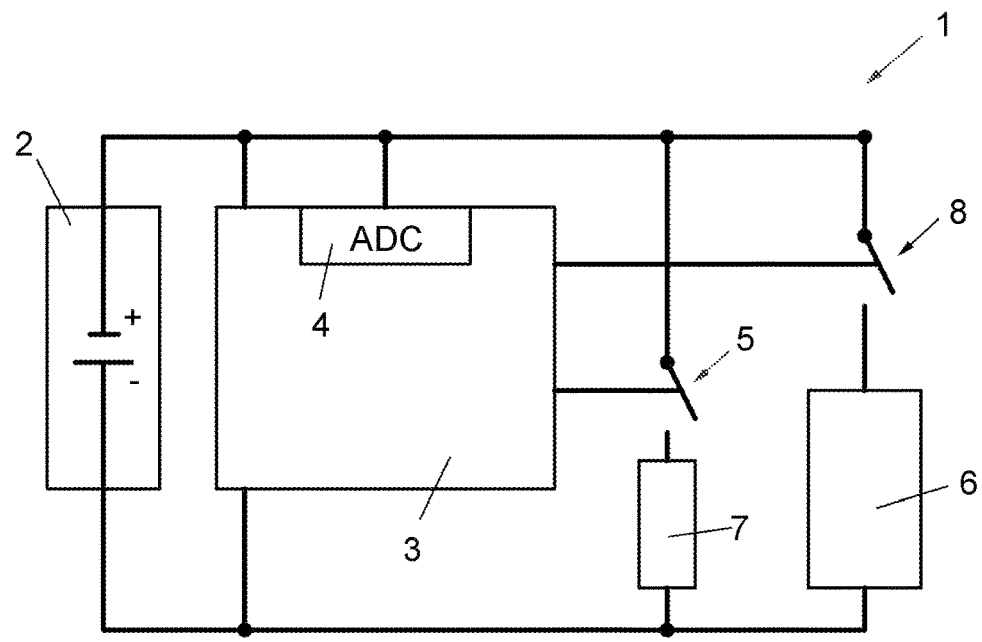
FIG. 1 shows schematically relevant electric circuitry of an electric user appliance according to a preferred embodiment adapted to perform the proposed method.

In FIG. 1, the electrical circuit 1 of a household electrical appliance is shown as an example. The household electrical appliance is battery-driven. Accordingly, the electrical circuit 1 comprises a secondary battery 2 (being a single cell secondary battery or a multi cell secondary battery having multiple single cells connected in series) for providing the necessary energy to the household electrical appliance during use. The secondary battery 2 might be charged under control of the control means 3 being, e.g., a suited microcontroller. Also the control means 3 is supplied with energy from the secondary battery 2. Further, the control means 3 has an input provided with an analogue digital converter 4 (ADC) to measure the voltage of the secondary battery 2 which is indicative of the current battery capacity (i.e. the state of charge of the battery 2).

The electrical circuit 1 comprises further a first switch 5 switchable by the control means 3. The first switch 5 switches on and off the main load 6 of the household electrical appliance, the main load 6 being in particular an electrical motor or the like. A preferred household electrical appliance in line with the invention is a hair removing device, such as a razor, epilator or the like, or a tooth treatment device, such as a toothbrush, oral irrigator or the like.

Optionally, the electrical circuit 1 comprises a secondary load 7 switchable on and off through a second switch 8. The second switch 8 can also be actuated by the control means 3. This secondary load 7 is, e.g. a resistor suited to discharge the secondary battery without producing high dissipation heat to a desired capacity value.

Figure 2:
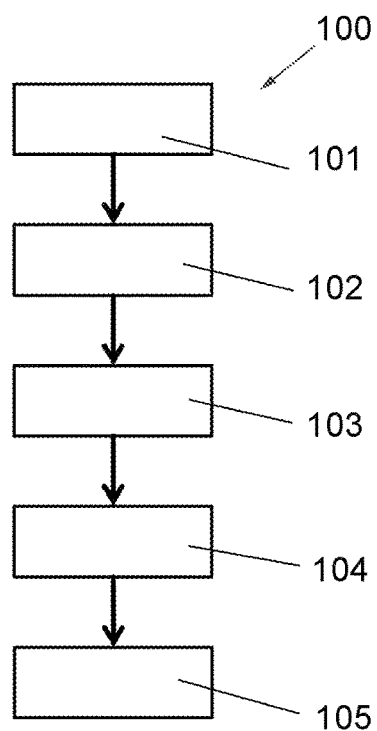
FIG. 2 shows a flow chart for performing the proposed method according to a preferred embodiment of the invention.

To this aim, the control means 3 is adapted to perform the following method steps that are described with respect to FIG. 2.

According to a preferred embodiment of the invention, the process flow 100 of the proposed method according to a preferred example comprises in a first method step 101 the recognition of a situation of storage of the household electrical appliance in which the household electrical appliance is not in use. This might be based on monitoring the switching off and on of the main load 6 of the household electrical appliance and/or on monitoring the charging of the secondary battery 2. If neither use nor charging has occurred in a defined non-use-period before the current point in time, it is assumed that the household electrical appliance is not in use. Alternatively, an input command might be given to the control means 3 by a suited input device not shown in FIG. 1 indicating that storage of the household appliance should now be prepared.

In following step 102, the current capacity of the secondary battery 2 is determined by measuring the battery voltage using the analogue digital converter 4 of the control means 3 in a state when the electrical load 6 is switched off. In case the determined current capacity is too low to initialize a storage of the household appliance without incurring damage to the secondary battery 2, the process might be either stopped or charging might be performed if the electrical circuit 1 of the household electrical appliance is connected to a charger. The charging process might be controlled by the control means 3 in a similar way as the discharging described more in detail below.

Else, if the determined current capacity of the secondary battery is high enough to initialize a storing procedure of the household electrical appliance, the current capacity of the secondary battery 2 is compared with a (predetermined) desired storage capacity for the electrical household appliance in step 103. This might be performed by comparison between the current measured battery voltage and a desired battery voltage corresponding to the desired storage capacity.

If the current capacity of the secondary battery 2 is higher than the desired storage capacity, in a following step 104 an energy-consuming load in the electrical household appliance is activated until the current storage capacity is equal to the desired storage capacity. This energy-consuming load might be an operational process of the control means 3 and—optionally—activation of the secondary load 7 by switching on switch 8 to close the circuitry of the secondary load 7. During this discharging process of the secondary battery 2, the voltage of the secondary battery is monitored until a desired voltage level is reached indicating the desired storage capacity of the secondary battery. This might be realized in form of a feed back control.

After reaching the desired storage capacity, an energy saving stand-by mode of the household electrical appliance is activated in step 105 until the household electrical appliance is used the next time.

Figure 3:
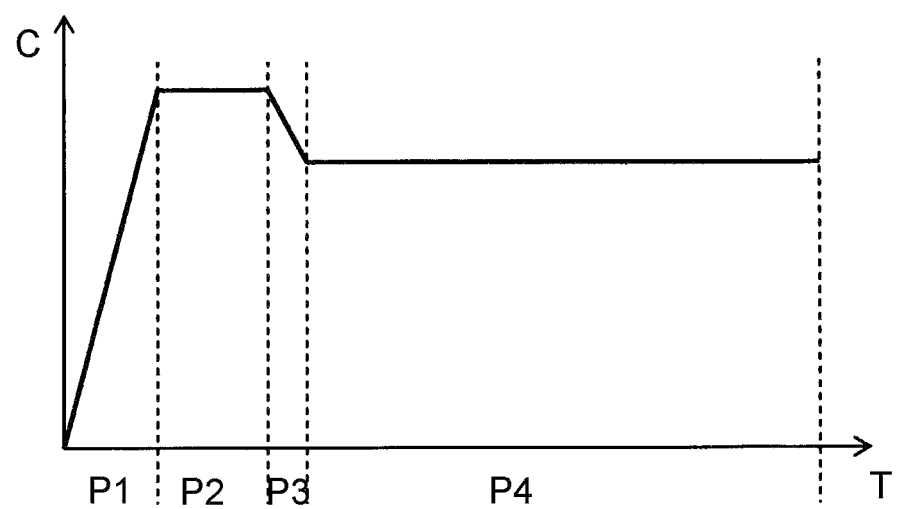
FIG. 3 shows a graph plotting the current capacity C (state of charge) against time T when applying the proposed method after charging of the battery according to one embodiment of the invention.

FIG. 3 shows the behavior of the current capacity C of the secondary battery 2 over time T when the proposed method is applied after charging. During time-period P1, the secondary battery of the household electrical appliance is charged until the maximum capacity (100%) or the desired capacity (e.g. 80%) is reached. After charging, a time-period P2 without use of the household electrical appliance is following in which the state of charge C (current capacity) remains basically unchanged. After a non-use time-period P2 of e.g. one day (or any other specified time-period), a situation of storage of the household electrical appliance is recognized and an energy-consuming load in the electrical household appliance is activated. With this activation of the energy-consuming load, the time-period P3 with a controlled discharge of the secondary battery 2 is started for a determined time. The determined time (until the end of the time-period P3) is chosen such that based on the known or measured energy consumption the current capacity corresponds the desired storage capacity, e.g. 60% to 80% of the maximum or desired capacity of the secondary battery. Then time-period P4 starts, in which the energy saving standby-mode is activated. The time-period P4 longs until the household electrical appliance is switched on and/or charged the next time. This time-period P4 accordingly corresponds to the time of storage of the household electrical appliance.

Figure 4:
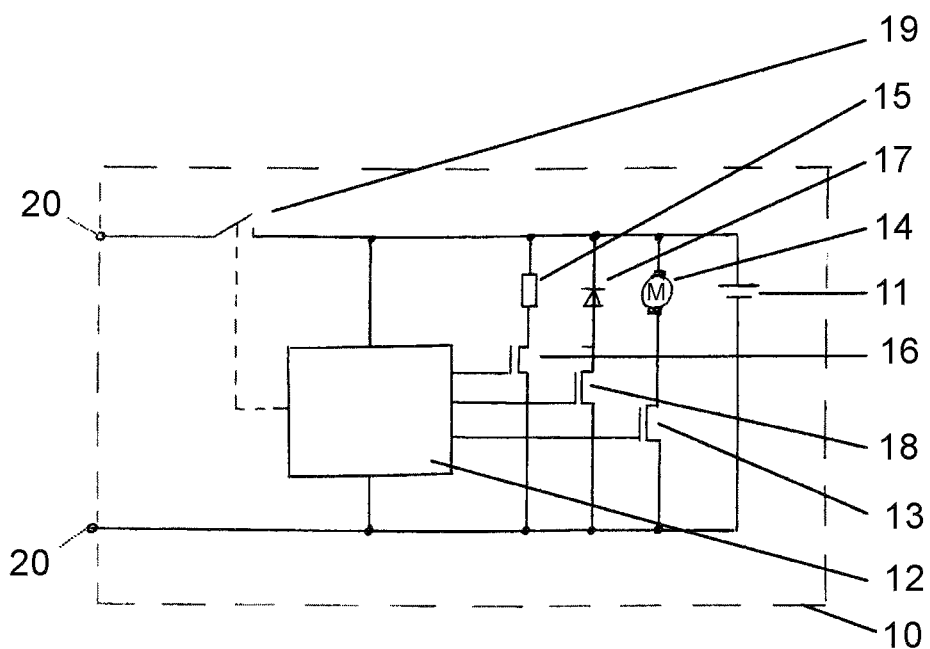
FIG. 4 shows schematically relevant electric circuitry of an electric user appliance according to another preferred embodiment of the invention.

In FIG. 4, an electrical circuit 10 of a household electrical appliance according to a similar embodiment with respect to FIG. 2 is shown. The electrical circuit 10 comprises a secondary battery 11 and a control means 12 adapted to perform charging of the secondary battery 11 and to apply the proposed method for controlling the battery capacity of a secondary battery (11) as already described in principle.

The electrical household appliance comprises in its electrical circuit 10 a first switch 13 switchable by the control means 12 to activate a main load 14 of the household electrical appliance in form of an electrical motor. Further, as a secondary load 15 for a controlled discharging of the secondary battery 11 upon recognition of a situation of storage is provided in form of a resistance. The secondary load 15 can be switched by the control means 12 through a second switch 16.

The circuitry also comprises a light emitting diode LED 17 for indicating the status of the secondary battery 11, e.g. charging and/or low capacity. The LED 17 can be switched on and off by the control means 12 through a third switch 18.

Further, the control means 12 can switch a fourth switch 19 to start and stop charging when the electrical circuit is connected via the connectors 20 to a charger, e.g. a charging cradle or dock.

All switches 13, 16, 18 in the second embodiment are transistors connected in series with the respective loads, i.e. the main load 14, the secondary load 15 and the LED 17. Also the switches 5, 8 shown in FIG. 1 for a first embodiment of the invention can be transistors connected in series with the respective main and secondary loads 6, 7.

With the proposed household electrical appliance and the method for controlling the battery capacity of the secondary battery 2, 11 in particular if storage of the household electrical appliance is intended, the lifetime of the battery 2, 11 can be enhanced. Further, by controlling the storage battery capacity of the secondary battery 2, 11, the manufacturing process is improved as the adjustment of the desired storage capacity is performed by the control of the control means 3, 12 of the household electrical appliance on its any without any further external control.

Further, lifetime of the battery 2, 11 is enhance during normal use as situations of storage of the household electrical appliance can be recognized and the current capacity of the secondary battery 2, 11 can be reduced to a desired storage capacity without any external control. The complete control of the method for controlling the battery capacity of a secondary battery 2, 11 in the electrical circuit 1, 10 can be performed by the control means 3, 12, e.g. a suited processor or the like.

In all embodiments described, the control means 3, 12 are or comprise according to the proposal a microcontroller. This microcontroller might be used as the only energy-consuming load as described in following embodiment of the proposed method with respect to FIG. 5.

Figure 5:
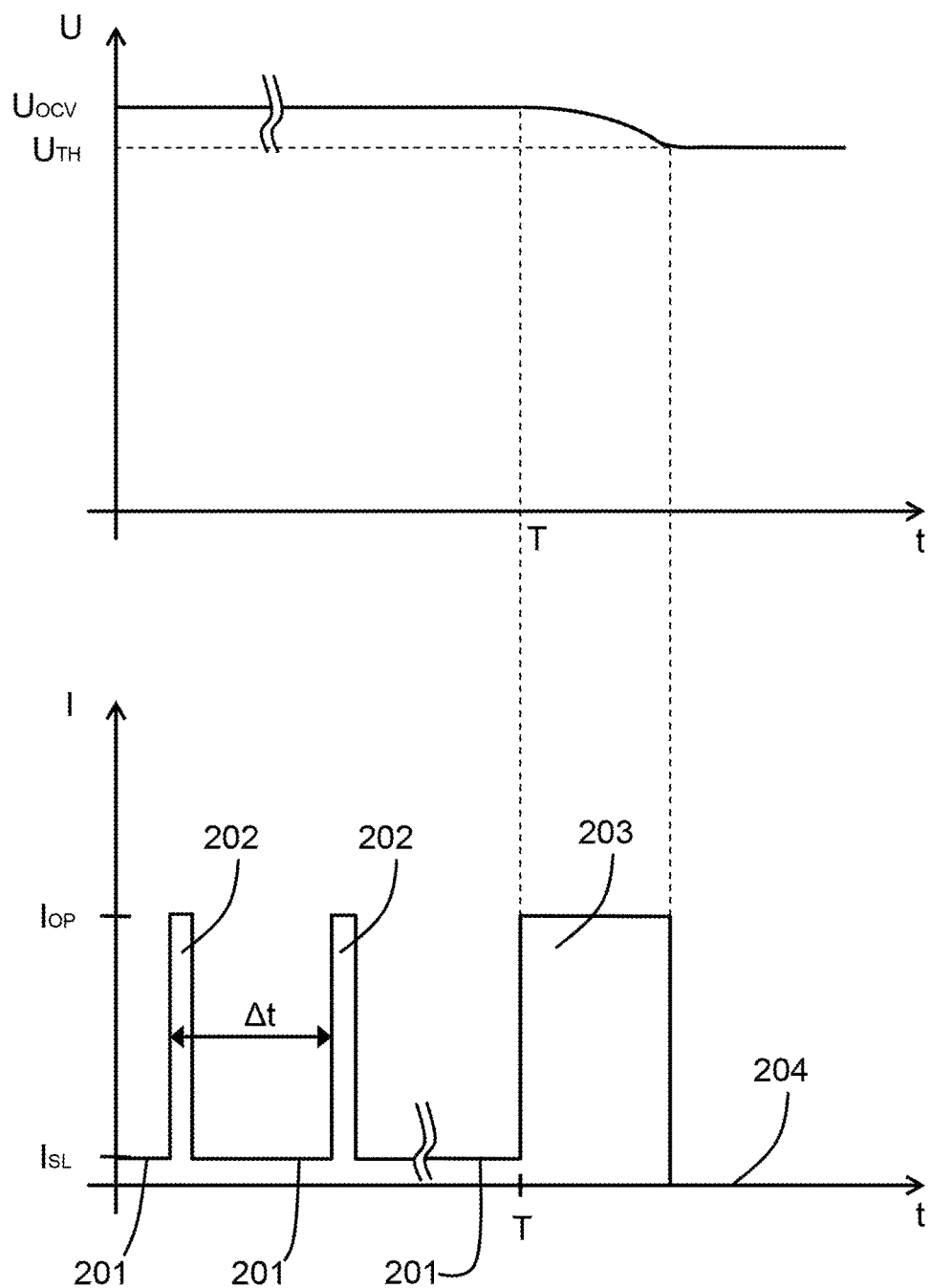
FIG. 5 shows schematically corresponding supply voltage and current diagrams for operating the microcontroller of the control device in line with a preferred embodiment of the proposed method.

The upper diagram of FIG. 5 shows schematically the voltage of the secondary battery 2 over the time t starting with a fully charged battery having the open circuit voltage $U_{OCV}$ for a time of 6 weeks in which the household electrical appliance is not used. After expiration of this defined non-use-period at the time T (i.e. the recognition of a situation of storage), the energy-consuming load is activated to reduce the capacity stored in the secondary battery. As a consequence of the reduced capacity, the supply voltage starts dropping, until a threshold voltage $U_{TH}$ corresponding to the desired storage capacity of the secondary battery is reached (indicated by the dashed horizontal line in the upper diagram FIG. 5).

The lower diagram of FIG. 5 shows the current supplied to the microcontroller during the same time period as displayed in the upper diagram of FIG. 5. At the beginning of the time line shown in FIG. 5, the household electrical appliance has a fully charged secondary battery 2 with the battery and supply voltage $U_{OCV}$, for example. The household electrical appliance is not in use, and is accordingly in a normal stand-by mode. In line with the proposal, the microcontroller is operated in a sleep modus 201 interrupted by operation pulses 202 in the operational modus during the normal stand-by of the household electrical appliance. During the sleep modus 201, the current consumption of the microcontroller is low compared to an operational modus. Low consumption during the sleep modus means, for example, preferably a current of about $I_{SL}$=100 µA. In contrast, during the operational modus, the current consumption of the microcontroller is, e.g., in the order of about $I_{OP}$=400 mA. This applies also to the operation pulses 202 in the stand-by mode of the household electrical appliance. The length of the operation pulses 202 might be in the order of up to 20-30 µs. The duty cycle Δt between two consecutive operation pulses 202 might be in the order of $I_{SL}$.

The operation pulses of the microcontroller might be used to test the household electrical appliance for switching on, checking the battery status, determining the non-use-period and/or other functions that should be performed even during a stand-by mode of the household electrical appliance.

The proposal is not limited to the consumption values mentioned before as an exemplary realization. In line with the proposal, other specific values for the voltage U, current I and time t can be chosen without leaving the basic idea of this proposal as described with respect to FIG. 5.

After expiration of a defined non-use-period in the order of one or more days or weeks, the microcontroller is permanently operated 203 in line with the proposal in order to consume energy and to lower the capacity in the secondary battery until a threshold voltage $U_{TH}$ (measured e.g. over the secondary battery) is reached. During operation of the microcontroller, it consumes permanently the higher operational current $I_{OP}$, compared to the significantly lower sleep current $I_{SL}$. With the sleep current $I_{SL}$ and short operation pulses consuming the operational current $I_{OP}$, the capacity of the secondary battery 2 does not significantly decrease within the defined non-use-period. The permanent current consumption with the operational current $I_{OP}$ leads to a faster decrease of the capacity of the secondary battery 2, even if no other (e.g. secondary) load is actuated in parallel.

In line with the proposal, the microcontroller surveys during its operation as activated energy-consuming load the voltage of the secondary battery 2 and switches off 204 the microcontroller entirely upon reaching the threshold voltage $U_{TH}$. Thus, not even the sleeping current $I_{SL}$ is consumed during this energy-saving stand-by mode of the household electrical appliance. Accordingly, the capacity of the secondary battery 2 is preserved during the energy saving stand-by mode—besides self-discharging of the secondary battery 2.

In line with the proposal, switching on of the household electrical appliance (and operation of the microcontroller) is only possible by again charging the secondary battery 2. Actuation of a switch does not activate the microcontroller and the household electrical appliance. Thus, the energy-saving stand-by mode cannot be deactivated inadvertently.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling the battery capacity of a secondary battery in a battery-driven household electrical appliance wherein the battery-driven household electrical appliance has an electrical load and a control means adapted to control the operation of the household electrical appliance and to monitor the capacity of the secondary battery, said method comprising the following steps:
   recognizing a situation of storage of the household electrical appliance in which the household electrical appliance is not in use;
   determining the current capacity of the secondary battery;
   comparing the current capacity of the secondary battery with a desired storage capacity for the electrical household appliance;
   activating an energy-consuming load in the electrical household appliance if the current capacity of the secondary battery is higher than the desired storage capacity until the current capacity is equal to the desired storage capacity;
   activating a controlled discharge state when after charging, the appliance is not used for a predetermined amount of time;
   activating an energy saving stand-by mode of the household electrical appliance after the controlled discharge state until the household electrical appliance is used the next time,
   wherein activation of the energy-consuming load comprises the activation of a microcontroller of the control means into an operational modus, wherein said energy saving stand-by mode of the household electrical appliance is stopped when the secondary battery of the household electrical appliance is charged.

2. The method according to claim 1, wherein the control means comprises a microcontroller that is driven in a stand-by mode when the household electrical appliance is not operated, wherein during the stand-by mode the microcontroller is operated in a sleep modus interrupted by operation pulses in the operational modus before activating the energy saving stand-by mode.

3. The method according to claim 2, wherein the energy saving stand-by mode comprises switching off the microcontroller.

4. The method according to claim 1, wherein a situation of storage of the household electrical appliance is recognized by monitoring the switching off and on of the appliance and/or the charging of the secondary battery of the household electrical appliance, wherein a situation of storage is assumed when the latest switching off and on and/or the latest charging has not occurred in a defined non-use-period before the current point in time.

5. The method according to claim 1, wherein a situation of storage of the household electrical appliance is recognized by initiation of a storage modus through a command to be executed by the control means.

6. The method according to claim 1, wherein the desired storage capacity is defined as a capacity range.

7. The method according to claim 1, wherein activation of the microcontroller into an operational modus means a mode in which the microcontroller has higher energy consumption than in a mode in which the microcontroller is switched on without any computational operation.

8. The method according to claim 1, wherein the activation of the energy-consuming load comprises switching on an additional current consuming load.

9. The method according to claim 1, wherein reaching the desired storage capacity by activating an energy-consuming load is determined by comparing an actually measured voltage to a threshold voltage that is adapted to the voltage of the secondary battery during activation of the load.

10. The method according to claim 1, wherein charging of the secondary battery is activated until the desired storage capacity of the secondary battery is reached if the current capacity of the secondary battery is lower than the desired storage capacity and the user electrical appliance is connected to a charger.

11. The battery-driven household electrical appliance having a secondary battery, an electrical load activated during use of the household electrical appliance, and a control means adapted to control the operation of the household electrical appliance and to monitor the capacity of the secondary battery, wherein the control means is adapted to switch off and on the electrical load of the household user electrical appliance, wherein the control means is further adapted to perform the method according to claim 1.

12. The battery-driven household electrical appliance according to claim 11, wherein the household electrical appliance comprises a secondary load switchable by the control means.

13. The battery-driven household electrical appliance according to claim 11, wherein the control means is adapted to measure the voltage of the secondary battery.

14. The battery-driven household electrical appliance according to claim 11, wherein the secondary battery is a single-cell secondary battery or a multi-cell secondary battery having multiple single cell connected in series.

* * * * *